P. DANIELS.

Tire Tightener.

No. 3,672.

Reissued Oct. 12, 1869.

Inventor:

P. Daniels.

By Munn & Co.

Attorneys.

Witnesses:

Wm. C. Lyon.

Wm. Treuron.

N. PETERS. Photo-Lithographer. Washington, D. C.

United States Patent Office.

JAMES ORR, OF HAMPDEN TOWNSHIP, PENNSYLVANIA, ASSIGNEE OF P. DANIELS.

*Letters Patent No.* 53,957, *dated April* 17, 1866; *reissue No.* 3,672, *dated October* 12, 1869.

TIRE-TIGHTENER.

The Schedule referred to in these Letters Patent and making part of the same.

*To all whom it may concern:*

Be it known that I, JAMES ORR, of Hampden township, Cumberland county, in the State of Pennsylvania, have become the sole owner of the Letters Patent of the United States for a new and useful Improvement in Tire-Tightener, which was granted to Philander Daniels, of Jackson, in the county of Jackson, in the State of Michigan, which Letters Patent are dated on the 17th day of April, 1866, and numbered 53,957; and for the purpose of reissuing the same, I do declare that the following is a full, clear, and exact description thereof, which will enable others skilled in the art to make and use the same, reference being had to the accompanying drawings, forming part of this specification, in which—

Similar letters of reference indicate like parts.

This invention has for its object the furnishing a convenient means by which the tire of a wheel may be tightened, to compensate for the shrinkage of the felloes, or the stretching of the tire, as and when it may become loose by said shrinkage or stretching; and It consists in combining with the rim of a wheel a screw, with a right-hand thread on one end thereof, and a left-hand thread on the other end, and a lever-wheel or projection in the centre of the right-and-left threaded screw, for the purpose of operating or turning it, the said screw operating upon lugs or inward projections on the inside of the ends of the tire; and also, in combination with the said right-and-left threaded screw, &c., a cap or caps, as hereinafter more fully explained and described.

A are the felloes; B, the spokes; D, the hub; and E, the tire of a wheel.

Figure 1:
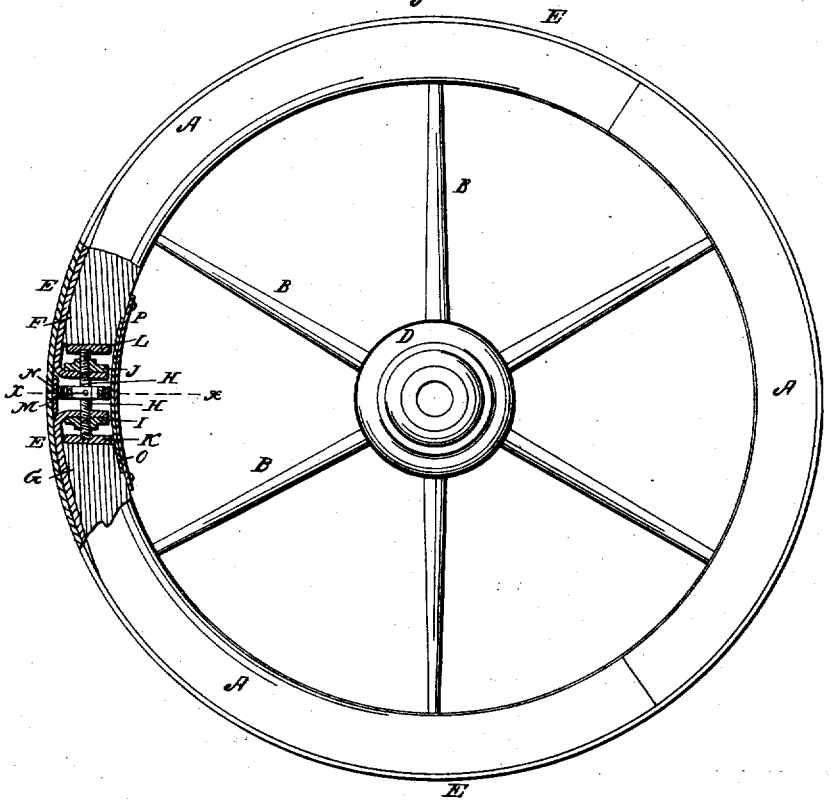
Figure 1 is a side view of a wagon-wheel, partly in section, with the improved tire-tightener attached.

The ends of one or both of two consecutive felloes are cut away, as represented in fig. 1, to allow space for the insertion of the improvement. The tire is also cut or shortened, as shown in fig. 1, and when applied to the wheel, should be of such a length that there will remain a space between the ends of the tire when it is drawn tightly around the felloes.

To the under side of the tire E are two lugs, formed by the ends of the pieces F and G being extended inward at right angles with the tire, so that said lugs project into the space formed by cutting away the ends of the felloes A.

Holes are made through these lugs, for the screw H.

This screw H has a right-thread cut on one end, and a left-thread cut on the other, so that by turning the wheel on the screw, the nuts I and J may both be drawn up or forced back at the same time.

The ends of the screw H rest against the plates K and L, which cover the ends of the felloes A, and prevent the ends of the screw from being forced into the ends of the felloes.

The screw H is operated by the lever-wheel M, which is attached to its centre, as shown.

Around the circumference of said wheel are formed holes, into which fits the end of a small lever, by which the wheel may be turned, when desired.

The wheel or projection may be made of a suitable form on its exterior for the application of a wrench to turn it, instead of the holes and lever.

N is a small plate, placed under the cut or opening between the ends of the tire E, to prevent dirt or mud from passing into the space occupied by the screw H.

The plate N may have a projecting ridge or flange projecting into the opening between the ends of the tire, as shown.

O is a cap, covering the opening between the ends of the felloes. This cap has a slit through its lower side, directly opposite the lever-wheel M, through which the lever may be inserted, for operating the wheel M and screw H.

Figure 2:
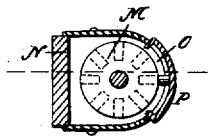
Figure 2 is a cross-section through the line *x x*, fig. 1.
Figure 3:
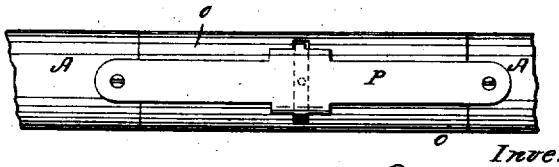
Figure 3 is an under-side view of that part of the rim of the wheel at which the tire-tightener is attached.

This opening through the cap O is covered by a second cap, P, which has a pin, shown in fig. 2, and in dotted lines in fig. 3, which may be inserted in one of the holes in lever-wheel M, to keep it firm in its position.

Some of the parts of the improved tire-tightener may be modified without changing the character of the invention, such as welding or forging the lugs or parts F and G to the ends of the tire E; or screw-threads may be cut in the holes of the lugs, to engage with the threads on the screw H in place of the nuts I and J.

The operation of tightening or loosening the tire would be precisely the same, and the wheel M may be made six or eight-sided, instead of round, so as to engage with a wrench, by which it may be operated.

Having thus described the improved tire-tightener,

What is claimed as new, and desired to be secured by Letters Patent—

1. The right-and-left threaded screw H, in combination with the lugs F and G, and nuts I and J, or their equivalents, and the tire of a wheel, arranged and operating substantially in the manner and for the purpose herein shown and specified.

2. The plates K and L, in combination with the right-and-left threaded screw H, arranged and combined substantially as and for the purpose herein shown and described.

3. The caps O and P, or their equivalent, in combination with the right-and-left threaded screw H, arranged with relation to each other and the rim of a wheel, substantially as and for the purpose specified.

4. The combination and arrangement of the right-and-left threaded screw H, and lugs F G, and nuts I J, or their equivalent, plates K L, and caps O and P, or their equivalent, and the tire of a wheel, substantially as and for the purpose herein shown and set forth.

JAMES ORR.

Witnesses:
GEORGE T. PALMER,
F. E. JOINER.